United States Patent
Yonai et al.

(10) Patent No.: US 11,349,769 B1
(45) Date of Patent: May 31, 2022

(54) METHOD AND NETWORK DEVICE FOR CONTROLLING THE FLOW OF DATA TRAFFIC

(71) Applicant: Marvell Israel (M.I.S.L) Ltd., Yokneam (IL)

(72) Inventors: Yakov Yonai, Tel Aviv (IL); Alex Pinskiy, Ashkelon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 130 days.

(21) Appl. No.: 16/563,761

(22) Filed: Sep. 6, 2019

Related U.S. Application Data (60) Provisional application No. 62/728,615, filed on Sep. 7, 2018.

(51) Int. Cl.
  *H04L 47/30* (2022.01)
  *H04L 47/2408* (2022.01)
  *H04L 69/324* (2022.01)

(52) U.S. Cl.
  CPC .......... *H04L 47/30* (2013.01); *H04L 47/2408* (2013.01); *H04L 69/324* (2013.01)

(58) Field of Classification Search
  CPC .... H04L 47/30; H04L 47/2408; H04L 69/324
  USPC ............. 370/231, 235, 236, 230, 237
  See application file for complete search history.

(56) References Cited

U.S. PATENT DOCUMENTS

| | | | | |
|---|---|---|---|---|
| 7,668,103 | B1* | 2/2010 | Pannell | H04L 47/26 370/237 |
| 7,782,770 | B1* | 8/2010 | Pannell | H04L 12/66 370/229 |
| 2003/0172220 | A1* | 9/2003 | Hao | H04L 47/266 710/305 |
| 2003/0212814 | A1* | 11/2003 | Tzeng | H04L 49/901 709/235 |
| 2004/0179476 | A1* | 9/2004 | Kim | H04L 47/2408 370/230 |
| 2008/0192633 | A1* | 8/2008 | Ahn | H04L 47/266 370/231 |
| 2011/0080834 | A1* | 4/2011 | Hirota | H04L 47/20 370/236 |

OTHER PUBLICATIONS

"Ethernet flow control," Wikipedia, available at https://en.wikipedia.org/w/index.php?title=Ethernet_flow_control &oldid =925020540, last edited Nov. 7, 2019 (5 pages).

(Continued)

*Primary Examiner* — Kwang B Yao
*Assistant Examiner* — Syed M Bokhari (57) ABSTRACT

A method for controlling the flow of data traffic on a destination device in a network involves (a) providing a table associated with the destination device; (b) reading each entry of the table from the start of the table to the end of the table; (c) for each port entry read, determining whether a buffer storage threshold for data received from a source port has been exceeded. When the buffer storage threshold for data received from the source port is determined to have been exceeded, an internal stop message is transmitted to a media access control unit on the destination device, otherwise an internal continue message is transmitted to the media access control unit. Operations (b) and (c) are repeated for each of a plurality of read cycles.

20 Claims, 7 Drawing Sheets

(56) References Cited

OTHER PUBLICATIONS

"Class of service," Wikipedia, available at https://en.wikipedia.org/w/index.php?title=Class_of_service&oldid=891673626, last edited Apr. 9, 2019 (1 page).

IEEE Std 802.1Q™—2014 (Revision of IEEE Std.802.1Q-2011), "IEEE Standard for Local and Metropolitan Area Networks—Bridges and Bridged Networks," *The Institute of Electrical and Electronics Engineers, Inc.*, 1,832 pages (Nov. 3, 2014).

* cited by examiner

| Entry type | Port number (if type = port)<br>Number of bubbles (if type = bubble)<br>TC number (if type = global TC) | TCs (if type = port) |
|---|---|---|
| Port | 0 | 11111111 |
| Global TC | 3 | — |
| Port | 1 | 0001000 |
| Bubbles | 1000 | — |

112

202 — Port row
204 — Global TC row
206 — Port row
208 — Bubbles row

METHOD AND NETWORK DEVICE FOR CONTROLLING THE FLOW OF DATA TRAFFIC

CROSS REFERENCES TO RELATED APPLICATIONS

This application claims the benefit of U.S. Provisional Patent App. No. 62/728,615, entitled "Priority Flow Control Retransmit," filed on Sep. 7, 2018, the disclosure of which is hereby expressly incorporated herein by reference in its entirety.

FIELD OF TECHNOLOGY

The present disclosure relates generally to network communication and more particularly to a method and network device for controlling the flow of data traffic.

BACKGROUND

Data traffic on large networks, such as the Internet, is managed according to various well-known standards and protocols. At the data link layer, flow control is used in order to prevent congestion from occurring in the various parts of the network. Two well-known standards for carrying out flow control are Institute of Electrical and Electronics Engineers (IEEE) 802.1Qbb (Priority-based flow control) and IEEE 802.3x, which defines a flow control PAUSE frame. There are times, however, when these mechanisms fail.

In some cases, failure occurs because the device (e.g., the router) that should have transmitted a priority-based flow control (PFC) frame or a PAUSE frame fails to do so (e.g., due to internal bottlenecks). In other cases, the PFC frame is sent but gets lost due to failure of an Ethernet link.

SUMMARY

In an embodiment, a method for controlling the flow of data traffic on a destination device in a network, wherein the destination device is communicatively linked to one or more source devices via a network coupling, the one or more source devices comprising one or more ports, comprises: (a) providing a table associated with the destination device, wherein the table comprises a plurality of entries, the plurality of entries including a plurality of port entries, each port entry containing data regarding a port of a source device of the one or more source devices, wherein the table has a start and an end; (b) reading each entry of the table from the start of the table to the end of the table; (c) for each port entry read, determining whether a buffer storage threshold for data received from the port has been exceeded, carrying out an operation defined by: when the buffer storage threshold for data received from the port is determined to have been exceeded, transmitting an internal stop message to a media access control unit on the destination device to indicate that transmissions from the source port are to be stopped, when the buffer storage threshold for data received from the port is determined not to have been exceeded, transmitting an internal continue message to the media access control unit on the destination device to indicate that transmissions from the source port are to be continued; and (d) repeating (b) and (c) for each of a plurality of read cycles.

According to an embodiment, the method further comprises, during at least one of the plurality of cycles: receiving at the media access control unit the internal stop message; and in response to the stop message, the media access control unit transmitting, via the network coupling, a flow control frame to the source port indicating that transmissions from the source port are to be stopped.

In an embodiment, the method further comprises the media access control unit receiving a subsequent internal stop message; and the media access control unit refraining from taking action in response to the subsequent internal stop message.

According to an embodiment, the method further comprises, during at least one of the plurality of cycles: the media access control unit receiving the internal continue message; and in response to the message, the media access control unit transmitting, via the network coupling, a flow control frame to the source port indicating that transmissions from the port are to be continued.

In an embodiment, the method further comprises the media access control unit receiving a subsequent internal continue message; and the media access control unit refraining from taking action in response to the subsequent internal continue message.

According to an embodiment, at least one of the plurality of entries of the table contains data indicating a period of a delay during which operation (d) is not to be executed, and the method further comprises: pausing the execution of operation (d) after each of the plurality of read cycles for the period of the delay.

In an embodiment, a method for controlling the flow of data traffic on a destination device in a network, wherein the destination device is communicatively linked to one or more source devices via a network coupling, the one or more source devices comprising one or more ports, comprises: (a) receiving communication frames from a source device of the one or more source devices via the network coupling, wherein each communication frame includes a header that indicates a traffic class of data contained in the communication frame; (b) providing a table associated with the destination device, wherein the table comprises a plurality entries, including at least one traffic class entry that specifies a traffic class of data, wherein the table has a start and an end; (c) reading each entry of the table from the start of the table to the end of the table; (d) for each traffic class entry read, determining whether a buffer storage threshold for data received of the traffic class specified in the traffic class entry has been exceeded; carrying out an operation defined by: when the buffer storage threshold for data received of the traffic class specified in the traffic class entry is determined to have been exceeded, transmitting an internal stop message to a media access control unit on the destination device to indicate that transmissions of the specified traffic class are to be stopped, when the buffer storage threshold for data received of the traffic class specified in the traffic class entry is determined not to have been exceeded, transmitting an internal continue message to a media access control unit on the destination device to indicate that transmissions of the specified traffic class are to be continued; and (e) repeating (c) and (d) for each of a plurality of read cycles.

According to an embodiment, the table further comprises one or more port entries, each port entry containing data regarding a port of a source device of the one or more source devices, and the method further comprises: for each port entry read, determining whether a buffer storage threshold for data received from the port has been exceeded, carrying out an operation defined by: when the buffer storage threshold for data received from the port is determined to have been exceeded, transmitting an internal message to a media access control unit on the destination device indicating that transmissions from the port are to be stopped, and when the buffer storage threshold for data received from the port is determined not to have been exceeded, transmitting an internal message to a media access control unit on the destination device indicating that transmissions from the port are to be continued.

In an embodiment, the method further comprises, during at least one of the plurality of read cycles: the media access control unit receiving the internal stop message; and in response to the stop message, the media access control unit transmitting, via the network coupling, a flow control frame to the source device indicating that transmissions of the specified traffic class are to be stopped.

According to an embodiment, the method further comprises: the media access control unit receiving a subsequent internal stop message; and the media access control unit refraining from taking action in response to the subsequent internal stop message.

In an embodiment, the method further comprises, during at least one of the plurality of read cycles: the media access control unit receiving the internal continue message; and in response to the continue message, the media access control unit transmitting, via the network coupling, a flow control frame to the source device indicating that transmissions of the specified traffic class are to be continued.

According to an embodiment, the method further comprises: the media access control unit receiving a subsequent internal continue message; and the media access control unit refraining from taking action in response to the subsequent internal continue message.

In an embodiment, at least one of the plurality of entries of the table contains data indicating a period of a delay during which operation (d) is not to be executed, and the method further comprises pausing the execution of operation (d) after each of the plurality of read cycles for the period of the delay.

According to an embodiment, (c) and (d) are carried out on a first die of the destination device, and the method further comprises: on a second die of the destination device, receiving the internal stop message and, in response to the stop message, transmitting, via the network coupling, a flow control frame to the source device to indicate that transmissions of the specified traffic class are to be stopped.

In an embodiment, a destination device comprises a media access control unit and hardware configured to: (a) provide a table, wherein the table comprises a plurality of entries, the plurality of entries including a plurality of port entries, each port entry containing data regarding a port of a source device of one or more source devices, wherein the table has a start and an end; (b) read each entry of the table from the start of the table to the end of the table; (c) for each port entry read, determine whether a buffer storage threshold for data received from the port has been exceeded, carry out an operation defined by: when the buffer storage threshold for data received from the port is determined to have been exceeded, transmit an internal stop message to a media access control unit on the destination device to indicate that transmissions from the source port are to be stopped, and when the buffer storage threshold for data received from the port is determined not to have been exceeded, transmit an internal continue message to the media access control unit on the destination device to indicate that transmissions from the source port are to be continued; and (d) repeat (b) and (c) for each of a plurality of read cycles.

According to an embodiment, the hardware media access control unit is configured to, during at least one of the plurality of read cycles: receive the internal stop message; and in response to the stop message, transmit, via the network coupling, a flow control frame to the port indicating that transmissions from the port are to be stopped.

In an embodiment, the media access control unit is further configured to receive a subsequent internal stop message; and refrain from taking action in response to the subsequent internal stop message.

According to an embodiment, the media access control unit is configured to, during at least one of the plurality of read cycles receive the internal continue message; and in response to the continue message, transmit, via the network coupling, a flow control frame to the port indicating that transmissions from the port are to be continued.

In an embodiment, the media access control unit is further configured to receive a subsequent internal continue message; and refrain from taking action in response to the subsequent internal continue message.

According to an embodiment, at least one of the plurality of entries of the table contains data indicates a period of a delay during which operation (d) is not to be executed, and the method further comprises: pausing the execution of operation (d) after each of the plurality of read cycles for the period of the delay.

DETAILED DESCRIPTION

In embodiments described below, a destination device carries out internal retransmissions of flow control messages, which are triggered by repeatedly cycling through a priority flow control table. The table includes a plurality of port entries, each of which specifies a source port whose incoming data traffic buffer use is monitored. When the buffer use for a particular source port and/or traffic class exceeds a predetermined threshold, an internal flow control "transmit off" message for that source port is sent to the media access control (MAC) layer of the destination device. This process of checking, comparing, and sending of a "transmit off" message is repeated with each cycle through the table until the buffer use falls below the threshold. Once the buffer use falls below the threshold, an internal flow control "transmit on" message is sent to the MAC layer, and is repeated on each cycle through the priority flow control table. The repetition of internal messages to the MAC layer helps to ensure that internal congestion (e.g., congestion at a die-to-die interconnect) does not prevent the MAC layer from ultimately receiving the "transmit off" and "transmit on" messages.

Figure 1A:
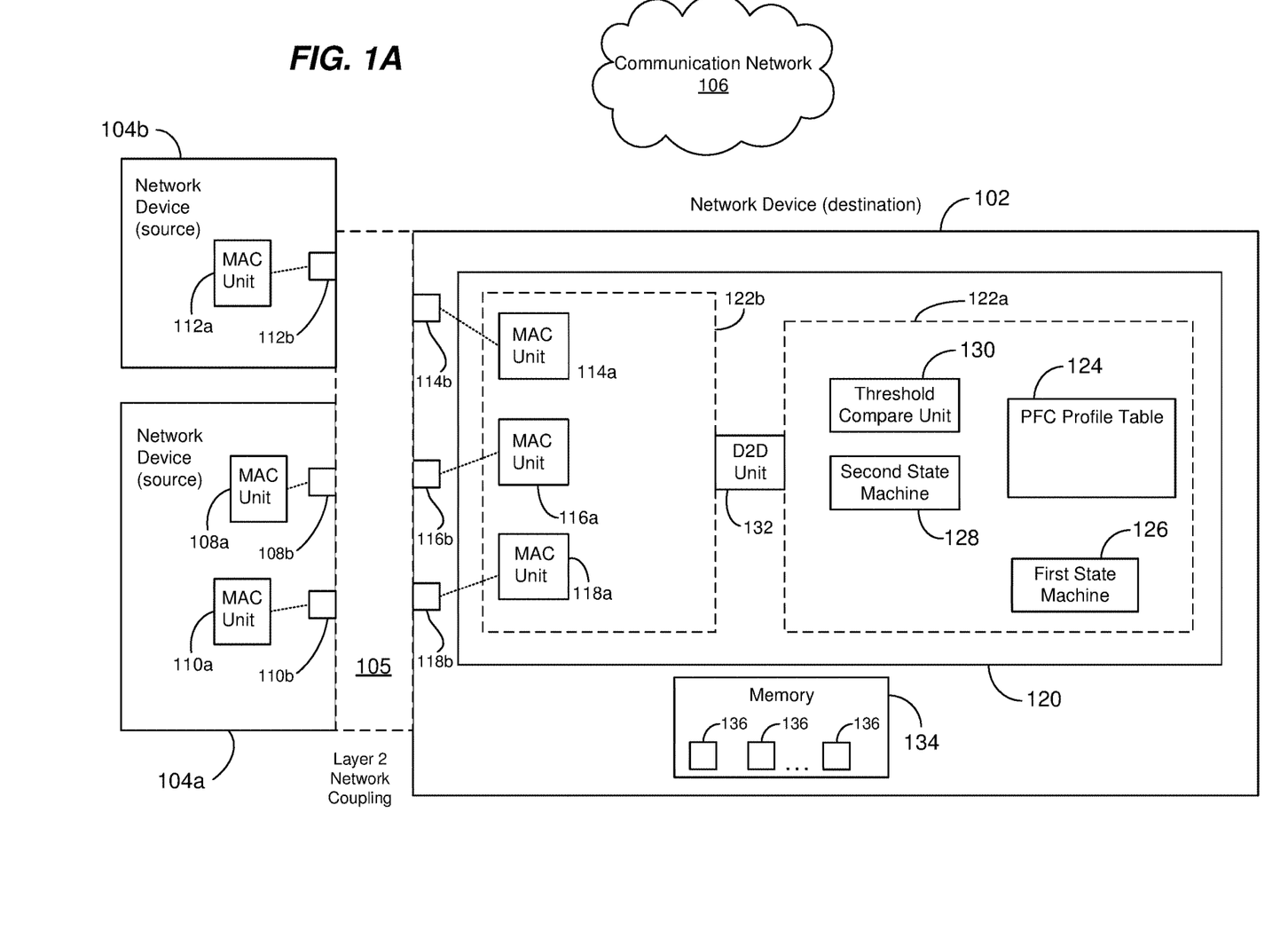
FIG. 1A is a block diagram of an example system for controlling the flow of data traffic, according to an embodiment.

Turning to FIG. 1A, in an embodiment, the techniques described herein are carried out in the context of a first network device 102 (e.g., a switch or a router). The first network device 102 is in communication with one or more other network devices, which are represented in FIG. 1A by a second network device 104a and a third network device 104b. The first, second, and third network devices 102, 104a, and 104b are among numerous network devices of a communication network 106. The first network device 102 will also be referred to herein as the destination device 102, while the second network device 104a and third network device 104b will also be referred to herein as the source device 104a and the source device 104b. The source devices 104a and 104b and the destination device 102 communicate with one another via Layer 2 network coupling 105 ("network coupling") (e.g., Ethernet cables) using a variety of communication protocols, including IEEE 802.1Qbb and IEEE 802.3x. The source devices 104a and 104b transmit different types of data traffic to the destination device 102. In one implementation, the source devices 104a and 104b transmit Ethernet frames to the destination device 102, and the data traffic carried in each Ethernet frame is assigned a traffic class according to the IEEE 802.1D standard. In some implementations, the Ethernet frame header includes a three-bit field indicating the traffic class. In an embodiment, the traffic classes transmitted by the source devices 104a and 104b to the destination device 102 include network control, voice, video, controlled load, excellent effort, best effort, and background, as set forth in the IEEE 802.1D standard.

The communication network 106 includes one of, or any suitable combination of two or more of, a wired network, a wireless network, a satellite network, a wide area network (WAN), a metropolitan area network (MAN), a local area network (LAN), a wireless LAN (WLAN), etc.

In an embodiment, the first source device 104a includes one or more media access control (MAC) units, represented by a first MAC unit 108a (source MAC 108a) and a second MAC unit 110a (source MAC 110a). The first MAC unit 108a manages a communication port 108b (source port 108b) and the second MAC unit 110a manages a communication port 110b (source port 110b). The second source device 104b also includes one or more MAC units, represented by MAC unit 112a (source MAC 112a), which manages a communication port 112b (source port 112b). Similarly, the destination device 104 includes one or more MAC units, represented by MAC units 114a, 116a, and 118a (destination MAC 114a, destination MAC 116a, and destination MAC 118a), each of which manages a respective communication port 114b, 116b, and 118b (destination port 114b, destination port 116b, and destination port 118b). Each MAC unit of FIG. 1A includes communication hardware configured to carry out the functions of a media access control layer. In an embodiment, each port depicted in FIG. 1A is a physical port (e.g., an Ethernet port) and is connected to a port on a remote device via the network coupling 105. In one example, destination port 114b is connected to source port 112b, destination port 116b is connected to source port 108b, and destination port 118b is connected to source port 110b. This example is only meant to be illustrative and many configurations are possible.

The destination device 102 includes a system on a chip (SOC) 120 that is made up of at least a first die 122a and a second die 122b. A priority-based flow control cascade (PFCC) profile table (PFCC table) 124, a first state machine 126, a second state machine 128, and a threshold compare unit 130 are disposed on the first die 122a. The destination device 102 further includes a die-to-die (D2D) interconnect unit 132 (D2D 132) and a memory 134 containing buffers 136. Finally, the MAC units 114a, 116a, and 118a are disposed on the second die 122b.

The term "state machine" as used herein is a general term for a piece of logic that operates by changing stages, based on the current stage and the system's input. It is noted that other programming constructs may be used instead of state machines.

According to an embodiment, the first state machine 126 reads, from the PFCC table 124, data regarding which source ports and/or traffic classes are being monitored in terms of buffer use and provides the data to the second state machine 128. Based on the data, the second state machine 128 transmits messages to the threshold compare unit 130. These messages are requests for the threshold compare unit 130 to read one or more buffer counters (counters that keep track of how many buffers of incoming data of each port and/or each traffic class (TC) are being taken up) with one or more threshold values. The threshold compare unit 130 makes the requested comparison and sends an internal message to the destination MAC that controls the destination port that is receiving data traffic from the source port being monitored. The content of the message depends on whether the counter (i.e., the data traffic received from the source port) has exceeded the threshold, and whether it has exceeded the threshold for a particular traffic class or has exceeded the threshold overall (i.e., regardless of traffic class). In general, the internal message contains one or more "transmit off" (Xoff) or "transmit on" (Xon) indicators. This internal message is sent to the appropriate destination MAC via the D2D 132. An Xoff indicator is also referred to herein as a "stop message" because it indicates (to the destination MAC) that a source port is to stop sending frames (e.g., all frames or frames of one or more traffic classes), while an Xon indicator is also referred to herein as a "continue message" because it indicates (to the destination MAC) that a source port is to continue sending frames (e.g., all frames or frames of one or more traffic classes).

According to an embodiment, upon receiving the first instance of an internal stop message, a destination MAC reacts by transmitting, to the source port concerned, a flow control frame indicating that transmissions are to be stopped. If the destination MAC receives subsequent consecutive internal stop messages, the destination MAC refrains from taking action in response to such subsequent internal stop messages. Similarly, upon receiving the first instance of an internal continue message, a destination MAC reacts by transmitting, to the source port concerned, a flow control frame indicating that transmissions are to be continued. If the destination MAC receives subsequent consecutive internal continue messages, the destination MAC refrains from taking action in response to such subsequent internal continue messages.

In an embodiment, the first state machine 126 has two states. If, on the destination device 102, the flow control feature is activated, the first state machine 126 is always in an "ACTIVE" state. Based on this state, an address counter for the table 124 is always incremented and wraps around on the table 124. To disable the feature, the destination device 102 writes to a register and this transfers the first state machine 126 to a "NOT ACTIVE" state, at which point the first state machine 126 stops reading.

According to an embodiment, the internal message is an 8 bit vector that includes one bit per traffic class. If the number of buffers being occupied by data received from a particular source port (regardless of traffic class) exceeds the threshold, then all 8 bits of the internal message are set to a value of 1. If the number of buffers being occupied by data received from the source port for a particular traffic class OR if the number of buffers being used for a particular traffic class by all source ports being monitored exceeds the threshold, then the corresponding bit (i.e., the bit corresponding to the traffic class) is set to a value of 1. Otherwise, the threshold compare unit 130 sets the corresponding bit to 0. It is noted that the internal message can be formatted and configured in a variety of ways and that the formats described herein are merely examples.

In an embodiment, the internal message generated is sent by the threshold compare unit 130 to the destination MAC whose destination port is receiving data traffic from the source port being monitored. Thus, for example, if the source port being monitored is port 112*b* and source port 112*b* is in a layer 2 connection with destination port 114*b*, then the threshold compare unit 130 sends the internal message to the first MAC unit 114*a*.

Figure 6:
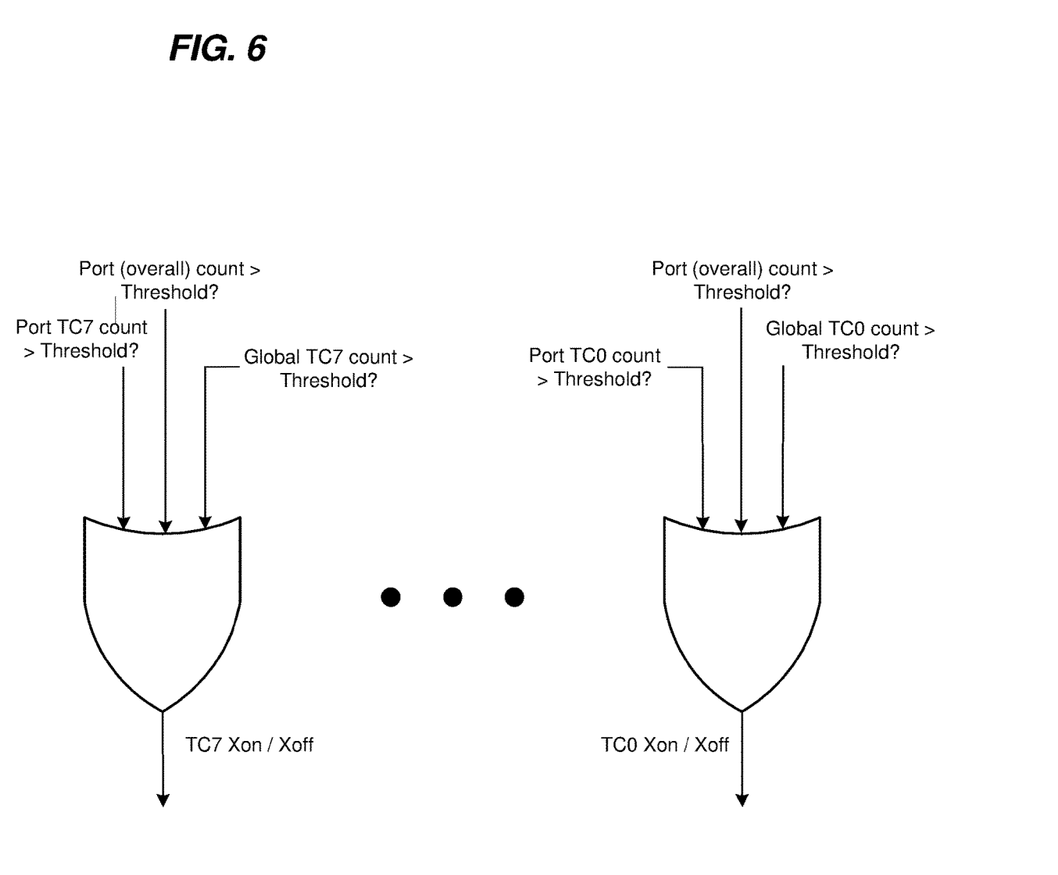
FIG. 6 depicts a logic gate representation of an internal message format, according to an embodiment.

Turning to FIG. 6, an example of logic gates configured to generate an internal message according to an embodiment is seen. In this example, there are eight OR gates—one for each bit of an 8 bit internal message. The value "Port TCn count" is the counter value for the number of buffers 136 occupied by incoming data traffic of traffic class n from the source port being monitored. The value "Port (overall) count" is the counter value for the number of buffers 136 occupied by incoming data traffic from the source port being monitored, regardless of traffic class. The value "Global TCn count" is the counter value for the number of buffers 136 occupied by incoming data traffic of traffic class n from all source ports being monitored. For each input to the OR gates, if the counter exceeds the threshold, then the input is set to a value of 1. Otherwise, the input is set to 0. At the output of each OR gate, if the value is 1, then the destination MAC receiving the internal message interprets this as an Xoff indicator for the traffic class corresponding to the bit position. If the value is 0, then the destination MAC receiving the internal message interprets this as an Xon indicator for the traffic class corresponding to the bit position. Thus, for example, an internal message of 10000000 is interpreted by the MAC unit as meaning that the source port from which the MAC unit's destination port is receiving data traffic can continue sending data traffic having a traffic class of 6, 5, 4, 3, 2, 1, or 0 but needs to stop sending data traffic of traffic class 7.

In an embodiment, each destination MAC 114*a*, 116*a*, and 118*a* has two flow control states—an Xon ("transmit on") state and an Xoff ("transmit off") state—for each traffic class. Thus, if there are eight traffic classes, then each destination MAC has eight instances of Xon/Xoff states, one for each traffic state, in an embodiment. The threshold compare unit 130 sends an Xoff message when the number of buffers occupied for a particular source port for a traffic class (PORT_TC) or for a traffic class for all source ports (GLOBAL_TC) exceeds the PFC threshold. The destination MAC transitions between the two states only when it receives an internal message from the threshold compare unit 130 indicating a change. Thus, for example, if the destination MAC is in an Xoff state for traffic class 7 and it receives an internal message indicating Xoff for traffic class 7, then the destination MAC remains in the Xoff state. On the other hand if the destination MAC is in an Xoff state for traffic class 7 and it receives an internal message indicating Xon for traffic class 7, then the destination MAC switches to the Xon state for traffic class 7. Similarly, if the destination MAC is in the Xon state for traffic class 7 and it receives an internal message indicating Xon for traffic class 7, then the destination MAC remains in the Xon state for traffic class 7.

In an embodiment, each destination MAC sends PFC or FC frames to the source MAC with which it is in communication only when the destination MAC transitions between the two states. Specifically, when the destination MAC transitions from an Xon state to an Xoff state for one or more traffic classes, then the destination MAC transmits a PFC or FC frame to the source MAC, telling the source MAC to stop transmitting data traffic for the traffic class(es) specified in the flow control frame. Similarly, when the destination MAC transitions from an Xoff state to an Xon state for one or more traffic classes, then the destination MAC transmits a PFC or FC frame to the source MAC, telling the source MAC to continue transmitting data traffic for the traffic class(es) specified in the flow control frame. In an embodiment, a single PFC frame includes indicators for the source MAC to stop transmitting data traffic of some traffic classes and to continue transmitting data traffic of other traffic classes.

According to an embodiment, the first state machine 126 reads the PFCC table 124 entry by entry and provides the data from each entry to the second state machine 128 until the first state machine 126 reaches the end of the PFCC table 124. The first state machine 126 then cycles back to the first entry of the PFCC table 124 and repeats the process. The process of first state machine 126 reading through every entry of the PFCC table 124 one time is referred to herein as a "read cycle."

In an embodiment, the PFCC table 124 includes a list of ports and traffic classes (TCs) for which the destination device 102 monitors the number of buffers occupied by incoming data traffic. In particular, the PFCC table 124 contains a number of entries, in which each entry indicates (a) the source port for which the buffer use is being monitored and/or the TCs being monitored for a given source port, (b) the TC whose global buffer use is being monitored, or (c) the number of clock cycles for the threshold compare unit 130 to refrain from sending messages to any destination MAC. For each instance of monitoring (by port and/or by TC), the destination device 102 executes a counter to count how many of the buffers 136 are used to hold incoming data traffic. For each counter, there is a corresponding threshold value (PFC threshold) (e.g., set by a user of the destination device 102) that represents the maximum number of buffers 136 that are to be used to hold incoming data traffic. In an embodiment, there is a single threshold value that applies to each type of buffer count (i.e., the threshold value for buffers per source port is the same as that for buffers per source port and TC, and the same as buffers per TC overall for all ports).

According to an embodiment, the second state machine 128 receives the data from the first state machine 128, parses the data, and generates requests to the threshold compare unit 130 to read the counters being executed and to compare the current value of the counters with the appropriate PFC thresholds.

In an embodiment, the PFCC table 124 includes up to 314 entries. In one implementation, there are three types of entries in the PFCC table 124: (1) a "Port" entry, which specifies the physical source port (i.e., the port of one of the source devices) for which buffer use (e.g., number of buffers 136) is being monitored and the TCs for which monitoring is to occur, (2) a "Global TC" entry, which specifies a particular TC for which buffer use across all ports is being monitored, and (3) a "Bubble" entry, which specifies a number of clock cycles or "bubbles," which specify a period of delay during which the threshold compare unit 118 refrains from sending (delays sending) any internal messages any destination MACs. The length of the PFCC table 124 (e.g., the number of entries) is determined by a user of the destination device 102.

According to an embodiment, upon receiving a request from the second state machine 128, the threshold compare unit 130 reads a counter that (a) represents the number of buffers 136 occupied by data originating from a particular source port, (b) represents the number of buffers 136 occupied by data originating from the source port for a particular traffic class, or (c) represents the number of buffers occupied by data originating from a traffic class across all ports, and compares that counter value to a maximum number of buffers (the threshold value). If the number of occupied buffers exceeds the threshold value, then the threshold compare unit 130 sends on Xoff indicator to the destination MAC whose destination port is receiving data traffic from the source port being monitored. In the internal messaging scheme described in conjunction with FIG. 6 above, the threshold compare unit sets the appropriate bit to 1 within an internal message to the destination MAC via the D2D 132. Conversely, if the number of occupied buffers does not exceed the threshold value, then the threshold compare unit 130 sends an Xon indicator to the destination MAC whose destination port is receiving data traffic from the source port being monitored. In the internal messaging scheme described in conjunction with FIG. 6 above, the threshold compare unit sets the appropriate bit to 0 within an internal message to the destination MAC.

Figure 1B:
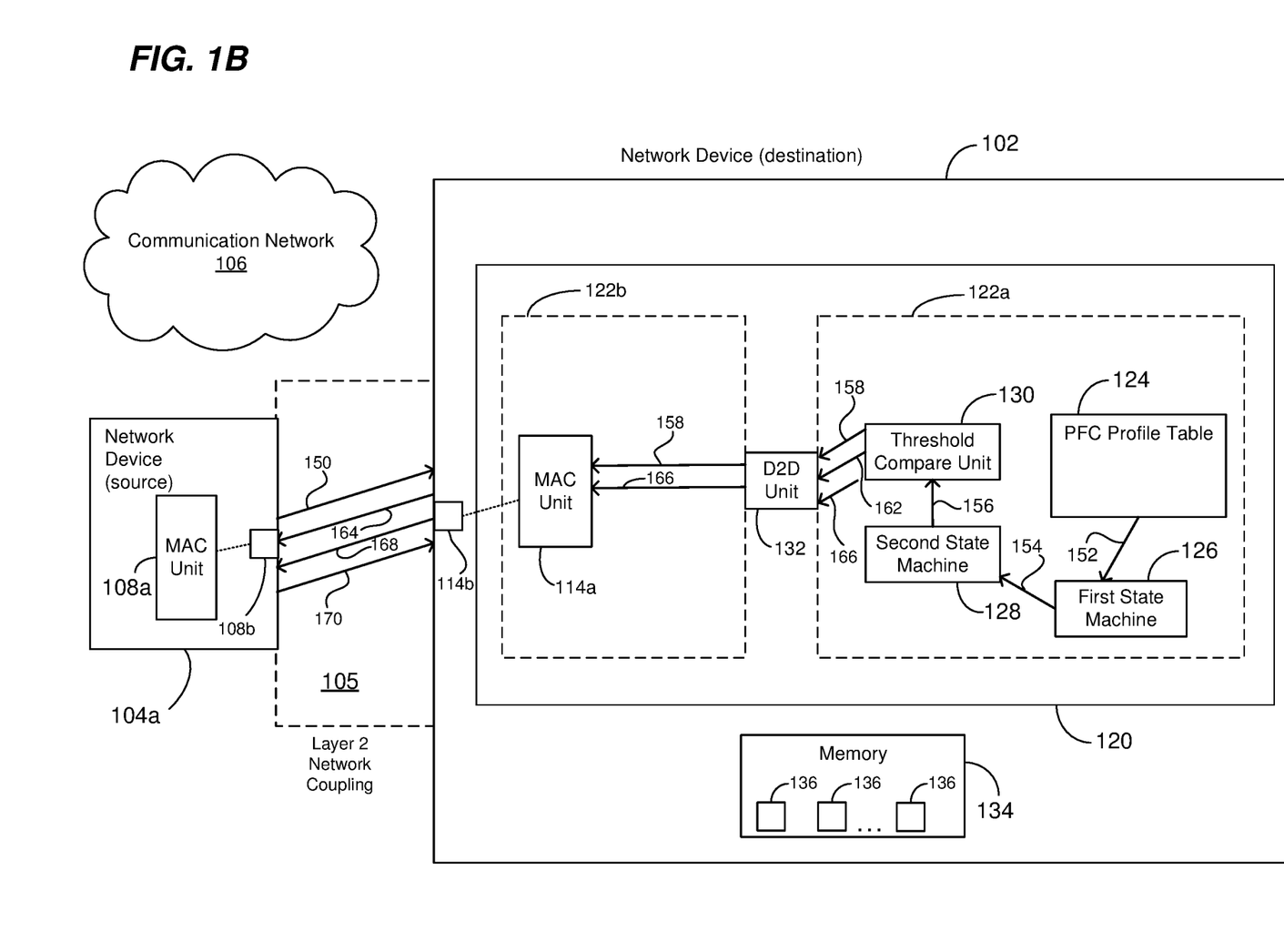
FIG. 1B depicts the flow of data between the various components of FIG. 1A, according to an embodiment.

Turning to FIG. 1B, a process flow within the destination device 102 and between the first source device 104a and the destination device 102 according to an embodiment is seen. The process operations are indicated by arrows. For ease of reference, the second network device 104b, source MAC 110a, source port 110b, destination MACs 116a and 118a, and destination ports 116b and 118b are not depicted in FIG. 1B. The initial state of destination MAC 114a in this example is Xon for all traffic classes. The source device 104a sends data traffic to the destination device 102 (operation 150). The first state machine 126 reads each entry of the PFCC table 124 (operation 152) and provides data from the PFCC table 124 to the second state machine 128 (operation 154). The periodicity of reading varies based on a backpressure mechanism between the first state machine 126 and the second state machine 128. For each non-bubble table entry, the second state machine 128 sends requests the threshold compare unit 130 to compare an occupied data buffer counter value with the appropriate threshold (operation 156). The threshold compare unit 130 makes the appropriate comparison, but at this point the data buffer threshold has not been exceeded. Thus, the threshold compare unit 130 sends an Xon indicator to the destination MAC 114a via the D2D 132 (operation 158). Operations 152, 154, 156, and 158 are repeated every read cycle as long as the number of data buffers 136 occupied by data traffic from the source port 108b (of the port and traffic class) has not exceeded a threshold value. Because the destination MAC 114a is already in an Xon state, the destination MAC 114a takes no action with respect to this process.

In an embodiment, the fill levels of the buffers 136 changes as newly received packets are buffered and processed packets are removed from the buffers for egress from destination device 102. As packets are received and buffered, the appropriate buffer counters are incremented in accordance with packet size and once a packet is removed, the corresponding counter is decremented by the same value.

Continuing with the example, at some point the data traffic originating from the source port 108b exceeds one of the thresholds (e.g., threshold for a particular source port and traffic class or threshold for a particular traffic class for all source ports) as determined by the threshold compare unit 130. In response to exceeding a threshold, the threshold compare unit 130 sends an Xoff indicator to the destination MAC 114a at operation 162 for the traffic class (or classes) for which the threshold has been exceeded. Operation 162 is repeated every read cycle as long as the threshold compare unit 130 determines that the number of data buffers occupied by the data traffic from the source port 108b for one or more traffic classes exceeds the threshold. Upon receiving the first Xoff indicator from the threshold compare unit 130 for a particular traffic class, the destination MAC 126 changes its status (from Xon to Xoff) for that traffic class and transmits a flow control frame to the source MAC 108a (operation 164). The flow control frame (e.g., a PAUSE frame) indicates that data traffic from the source port 108b of the indicated traffic class is to be stopped. The source MAC 108a responds by refraining from transmitting data traffic of the indicated traffic class to the destination port 114b.

Continuing with the example of FIG. 1B, the destination device 102 now has time to clear the received data traffic from the data buffers 136, thereby bringing the number of buffers occupied by the data traffic down until it is below the relevant threshold value. At such point, while carrying out its regular comparisons, the threshold compare unit 130 determines that the data traffic originating from the source device 104a is below the relevant threshold. The threshold compare unit 130 therefore transmits an Xon indicator to the destination MAC 114a for the appropriate traffic class at operation 166. Operation 166 will be repeated every read cycle for as long as the threshold compare unit 130 continues to determine that the relevant threshold has not been exceeded. The destination MAC 114a receives the first Xon indicator from the threshold compare unit 130, determines that there is a state change (the destination MAC 114a is currently in an Xoff state for the traffic class in question, but now changes to the Xon state for that traffic class), and therefore transmits a flow control frame to the source MAC 108a indicating that data traffic for that traffic class is to be sent (operation 168). At operation 170, the source MAC 108a resumes transmitting data traffic via source port 108b.

Figure 2:
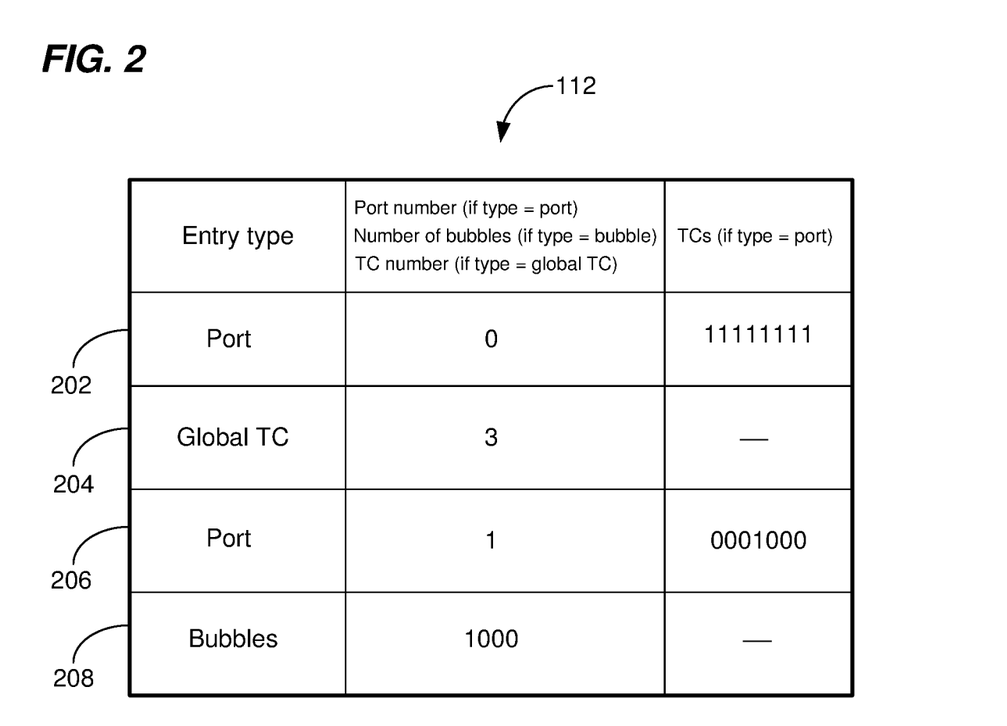
FIG. 2 depicts the priority-based flow control cascade (PFCC) table of FIG. 1A, according to an embodiment.

Turning to FIG. 2, an example of how the PFCC table 124 is configured and used according to an embodiment will now be described. In this example, a user of the destination device 102 enables the flow control feature for all TCs on source port 0 and source port 1. The user also enables the flow control feature globally for TC 3. In doing so, the user configures the length of the PFCC table 124 to be 4 entries. The first entry 202 is of the type "Port," with a value of 0 in the "Port Number" field (indicating that the entry relates to source port 0) and a value of 11111111 in the "TCs" field (indicating that the amount of data buffered from source port 0 of all eight TCs is to be monitored). Thus, upon receiving data for the first entry 202 from the first state machine 126, the second state machine 128 will generate requests for the threshold compare unit 130 to read and compare counter values (i.e., the number of buffers 136 used) to threshold values for the following source ports and TCs: port 0, TC 0; port 0 TC 1; port 0, TC 2; port 0, TC 3; port 0 TC 4; port 0, TC 5; port 0 TC 6; port 0 TC 7; and port 0 (which may, for example, take nine clock cycles), across all TCs. The port numbers are source ports, which are enumerated internally by the destination device 102. For example, in FIG. 1A, source port 112*b* might be port 0, source port 108*b* might be port 1, and source port 110*b* might be port 2.

The second entry 204 is of the type "Global TC" with a value of 3 in the "TC number" field, indicating that the total amount of data buffered from all source ports for traffic class 3 is to be monitored. Thus, upon receiving data for the second entry 204 from the first state machine 126, the second state machine 128 will generate requests for the threshold compare unit 108 to read and compare the counter value (i.e., the number of buffers 136 used) for TC 3 (which may, for example, take one clock cycle) across all source ports to its associated threshold value.

The third entry 206 is of the type "Port," with a value of 1 in the "Port Number" field (indicating that the entry relates to source port 1) and a value of 0001000 in the "TCs" field (indicating that the amount of data buffered from source port 1 for TC 3 is to be monitored). Thus, upon receiving data for the third entry 202 from the first state machine 126, the second state machine 128 will generate requests for the threshold compare unit 130 to read and compare counter values to threshold values for the following: source port 1 and TC 3; and source port 1 (which may, for example, take two clock cycles), across all TCs.

The fourth entry 208 is of the type "Bubbles" with a value of 1000 in the "Number of bubbles" field, indicating that second state machine 116 is to pause for 1000 clock cycles before sending any requests to the threshold compare unit 130. Thus, upon receiving data for the fourth entry 208 from the first state machine 126, the second state machine 128 will pause for 1000 clock cycles.

An advantage of the scheme described above, in an embodiment, is that every read cycle results in an internal message being sent to the destination MAC, so even if one or more internal messages are dropped (e.g., due to internal congestion at the D2D), the destination MAC still has a high probability of receiving at least one message from the threshold compare unit. In the example of FIG. 2, each PFCC cycle is 1000+1+9+2=1012 clock cycles. This means that every 1012 clock cycles, each counter will be read and compared against a PFC threshold, and the threshold compare unit 130 will make a decision as to whether to send an Xon or an Xoff to the destination MAC. If one of the messages containing these Xon or Xoff indicators is lost, it is guaranteed that in 1012 clock cycles the counter will be checked and compared with the threshold value again. For example, in an 800 MHz system, the rate of messaging is 8,000,000/1012 or roughly 0.8 MHz. It is to be understood that these values are only examples, and that in different systems, different values would be applicable.

In an embodiment, the second state machine 128 has the following states: BUBBLE, IDLE, PORT, PORT_TC, and GLOBAL_TC. In the BUBBLE and IDLE states, the second state machine 128 does not generate requests to the threshold compare unit 130. In the PORT state, the second state machine 128 generates a request for the threshold compare unit 130 to read the PORT counter (a counter of how many buffers a data from a particular source port is occupying). In the PORT_TC state, the second state machine 128 generates a request for the threshold compare unit 130 to read the PORT_TC counter (a counter of how many buffers a data of a particular traffic class and from a particular source port is occupying). In the GLOBAL_TC state, the second state machine 128 generates a request for the threshold compare unit 130 to read the GLOBAL_TC counter (a counter of how many buffers a data of a particular traffic class from all source ports is occupying). According to an embodiment, upon the parsing of a "PORT" entry in the PFCC table 124, the second state machine 128 transitions to the PORT_TC state for 1-8 cycles and then transitions to the PORT state for one cycle.

In the example of FIG. 2, according to an embodiment, the second state machine 128 first transfers from an IDLE (initial state) to a PORT_TC state until all requests to read port 0 traffic class counters (8 requests) are sent, then moves to a PORT state (per entry 202) and one request to read port 0 across all TCs will be sent. Then the second state machine 128 moves to a GLOBAL_TC state (because this is the next entry—entry 204), then to a PORT_TC state (per entry 206) in which is sends requests to read the counter for port 1, traffic class 3, then to a PORT state in which sends a request to read the counter(s) for port 1 across all traffic classes (also per entry 206), and then to a BUBBLE state (per entry 208).

Figure 3:
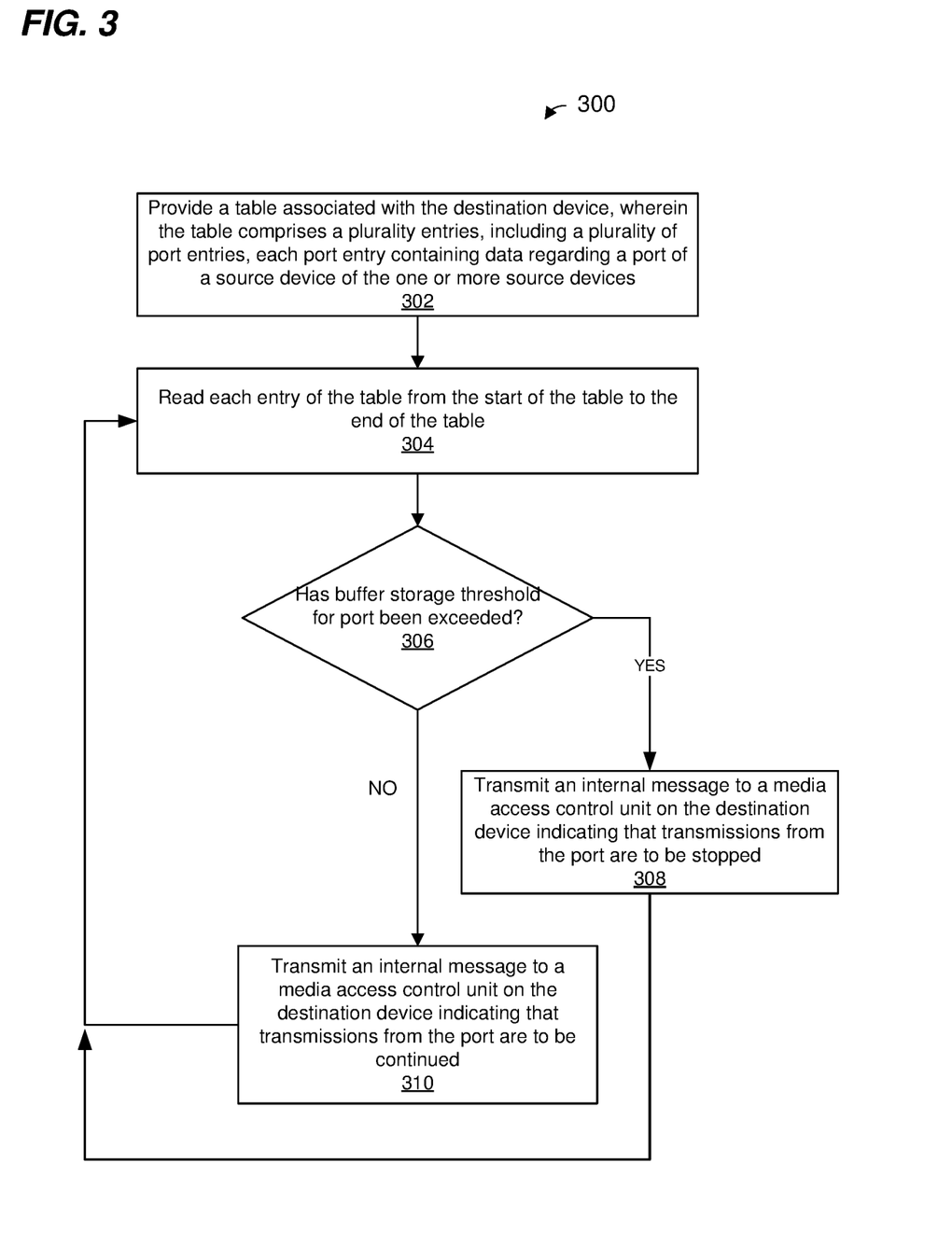
FIG. 3 is a flow diagram of an example method for controlling the flow of data traffic, according to an embodiment.

Turing to FIG. 3 a process 300 for controlling the flow of data traffic according to an embodiment will now be described. At block 302, the process involves providing (e.g., making available in memory) a table associated with a destination device, wherein the table comprises a plurality entries, including a plurality of port entries, each port entry containing data regarding a port of a source device of the one or more source devices. At block 304, the destination device reads each entry of the table from the start of the table to the end of the table. At block 306, for each port entry read from the table, an operation is carried out that is defined as follows: A determination is made as to whether a buffer storage threshold for data received from a port being monitored has been exceeded. If yes, then at block 308, an internal message is transmitted within the destination device to a media access control unit indicating that transmissions from the port being monitored are to be stopped. If no, then at block 310, an internal message is transmitted within the destination device to a media access control unit indicating that transmissions from the port being monitored are to be continued. The process then loops back to block 304.

Figure 4:
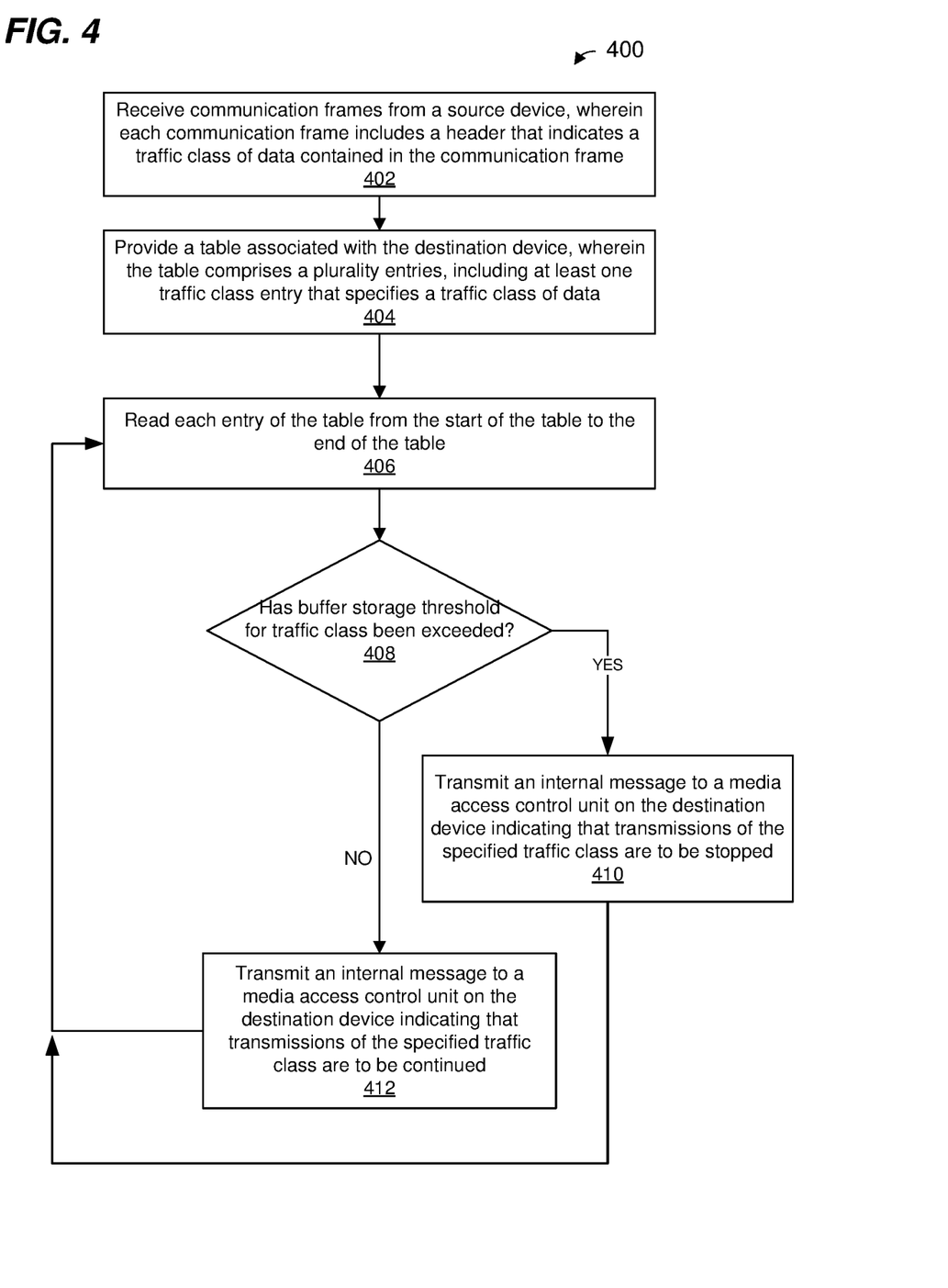
FIG. 4 is a flow diagram of an example method for controlling the flow of data traffic, according to another embodiment.

Turing to FIG. 4 a process 400 for controlling the flow of data traffic according to another embodiment will now be described. At block 402, a destination device receives communication frames from a source device, wherein each communication frame includes a header that indicates a traffic class of data contained in the communication frame. At block 404, the process involves providing (e g, making available in memory) a table associated with a destination device, wherein the table comprises a plurality entries, including at least one traffic class entry that specifies a traffic class of data. At block 406, the destination device reads each entry of the table from the start of the table to the end of the table. At block 408, for each traffic class entry read from the table, an operation is carried out that is defined as follows: A determination is made as to whether a buffer storage threshold for data received from a port being monitored has been exceeded. If yes, then at block 410, an internal message is transmitted within the destination device to a media access control unit indicating that transmissions from the port being monitored are to be stopped. If no, then at block 412, an internal message is transmitted within the destination device to a media access control unit indicating that transmissions of the specified traffic class are to be continued. The process then loops back to block 406.

Figure 5:
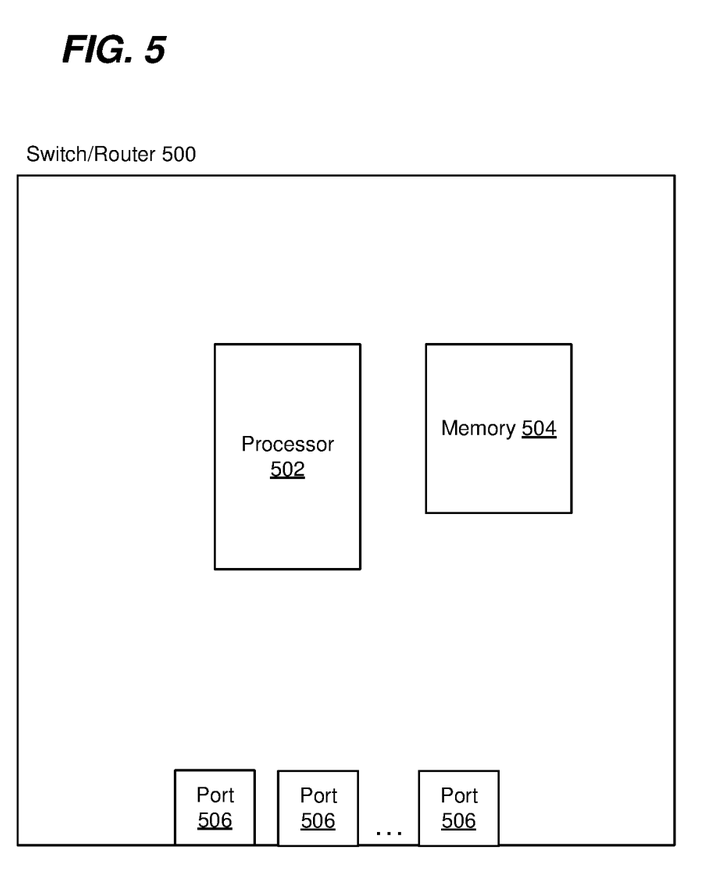
FIG. 5 is a block diagram of an example network device that carries out the techniques described herein, according to an embodiment.

Referring again to FIG. 1, the source device 104 and/or the destination device 102 are, or are components of, network infrastructure devices such as switches, routers, etc., in some embodiments. FIG. 5 is a diagram of an example switch or router 500 that is utilized as the source device 104 and/or the destination device 102 of FIG. 1, according to some embodiments.

The switch/router 500 includes a hardware processor 502 (e.g., one or more general-purpose microprocessors and/or one or more application specific integrated circuits) coupled to a memory 504. In an embodiment, the processor 502 is configured to execute machine readable instructions stored in the memory 506. The switch/router 500 also includes ports 506 that are configured to communicatively couple with respective network links (not shown). The memory 504 is used for storing data traffic received via the plurality of ports 506.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), etc.

While the disclosure has been set forth with reference to specific examples, which are intended to be illustrative only and not to be limiting of the invention, changes, additions and/or deletions may be made to the disclosed embodiments without departing from the scope of the claims.

What is claimed is:

1. A method for controlling the flow of data traffic on a destination device in a network, wherein the destination device is communicatively linked to one or more source devices via a network coupling, the one or more source devices comprising one or more ports, the method comprising:
   (a) providing a table associated with the destination device,
      wherein the table comprises a plurality of entries, the plurality of entries including a plurality of port entries, each port entry containing data regarding a respective source port among the one or more source ports of the one or more source devices,
      wherein the table has a start and an end;
   (b) reading each entry of the table from the start of the table to the end of the table;
   (c) for each port entry read,
      determining whether a buffer storage threshold for data received from the source port has been exceeded,
      carrying out an operation defined by:
         when the buffer storage threshold for data received from the port is determined to have been exceeded, transmitting an internal stop message to a media access control unit on the destination device to indicate that transmissions from the source port are to be stopped, and
         when the buffer storage threshold for data received from the port is determined not to have been exceeded, transmitting an internal continue message to the media access control unit on the destination device to indicate that transmissions from the source port are to be continued;
   (d) repeating (b) and (c) for each of a plurality of read cycles; and in response to the media access control unit receiving multiple internal stop messages associated with a first source port among the one or more ports, the media access control unit transmitting, via the network coupling, only one flow control frame to the first source port indicating that transmissions from the first source port are to be stopped.

2. The method of claim 1, further comprising, during at least one of the plurality of cycles:
   receiving at the media access control unit the internal stop message; and
   in response to receiving the internal stop message, the media access control unit transmitting, via the network coupling, a flow control frame to the source port indicating that transmissions from the source port are to be stopped.

3. The method of claim 2, wherein:
   transmitting the flow control frame to the source port is also in response to determining that the media access control unit did not transmit a previous flow control frame to the source port, the previous flow control frame indicating that transmissions from the source port are to be stopped; and
   the method further comprises, in response to determining that the media access control unit transmitted the previous flow control frame to the source port:
      the media access control unit refraining from transmitting the flow control frame to the source port in response to receiving the internal stop message.

4. The method of claim 1, further comprising, during at least one of the plurality of read cycles:
   the media access control unit receiving the internal continue message; and
   in response to receiving the internal continue message, the media access control unit transmitting, via the network coupling, a flow control frame to the source port indicating that transmissions from the source port are to be continued.

5. The method of claim 4, wherein:
   transmitting the flow control frame to the source port is also in response to determining that the media access control unit did not transmit a previous flow control frame to the source port, the previous flow control frame indicating that transmissions from the source port are to be continued; and
   the method further comprises, in response to determining that the media access control unit transmitted the previous flow control frame to the source port:
      the media access control unit refraining from transmitting the flow control frame to the source port in response to receiving the subsequent internal continue message.

6. The method of claim 1, wherein at least one of the plurality of entries of the table contains data indicating a period of a delay during which operation (d) is not to be executed, the method further comprising:
   pausing the execution of operation (d) after each of the plurality of read cycles for the period of the delay.

7. A method for controlling the flow of data traffic on a destination device in a network, wherein the destination device is communicatively linked to one or more source devices via a network coupling, the one or more source devices comprising one or more source ports, the method comprising:
   (a) receiving communication frames from a source device of the one or more source devices via the network coupling, wherein each communication frame includes a header that indicates a traffic class of data contained in the communication frame;
(b) providing a table associated with the destination device,
wherein the table comprises a plurality entries, including at least one traffic class entry that specifies at least one respective traffic class of data,
wherein the table has a start and an end;
(c) reading each entry of the table from the start of the table to the end of the table;
(d) for each traffic class entry read,
determining whether a buffer storage threshold for data received of the traffic class specified in the traffic class entry has been exceeded;
carrying out an operation defined by:
when the buffer storage threshold for data received of the traffic class specified in the traffic class entry is determined to have been exceeded, transmitting an internal stop message to a media access control unit on the destination device to indicate that transmissions of the specified traffic class are to be stopped, and
when the buffer storage threshold for data received of the traffic class specified in the traffic class entry is determined not to have been exceeded, transmitting an internal continue message to a media access control unit on the destination device to indicate that transmissions of the specified traffic class are to be continued;
(e) repeating (c) and (d) for each of a plurality of read cycles; and
in response to the media access control unit receiving multiple internal stop messages associated with a first traffic class among the one or more traffic classes, the media access control unit transmitting, via the network coupling, only one flow control frame to the first source port indicating that transmissions of the specific traffic class from the first source port are to be stopped.

8. The method of claim 7, wherein the table further comprises one or more port entries, each port entry containing data regarding a respective source port among one or ports of the one or more source devices, the method further comprising:
for each port entry read,
determining whether a buffer storage threshold for data received from the source port has been exceeded,
carrying out an operation defined by:
when the buffer storage threshold for data received from the source port is determined to have been exceeded, transmitting an internal message to a media access control unit on the destination device indicating that transmissions from the source port are to be stopped,
when the buffer storage threshold for data received from the source port is determined not to have been exceeded, transmitting an internal message to a media access control unit on the destination device indicating that transmissions from the source port are to be continued.

9. The method of claim 8, wherein (c) and (d) are carried out on a first die of the destination device, the method further comprising:
on a second die of the destination device,
receiving the internal stop message and
in response to the stop message, transmitting, via the network coupling, a flow control frame to the source device to indicate that transmissions of the specified traffic class are to be stopped.

10. The method of claim 7, further comprising, during at least one of the plurality of read cycles:
the media access control unit receiving the internal stop message; and
in response to receiving the internal stop message, the media access control unit transmitting, via the network coupling, a flow control frame to a first source device among the one or more source devices indicating that transmissions of the specified traffic class are to be stopped.

11. The method of claim 10, wherein:
transmitting the flow control frame to the first source device is also in response to determining that the media access control unit did not transmit a previous flow control frame to the first source device, the previous flow control frame indicating that transmissions of the specified class are to be stopped; and
the method further comprises, in response to determining that the media access control unit did transmit the previous flow control frame to the first source device:
the media access control unit refraining from transmitting the flow control frame to the first source device in response to receiving the internal stop message.

12. The method of claim 7, further comprising, during at least one of the plurality of read cycles:
the media access control unit receiving the internal continue message; and
in response to receiving the internal continue message, the media access control unit transmitting, via the network coupling, a flow control frame to a first source device among the one or more source devices indicating that transmissions of the specified traffic class are to be continued.

13. The method of claim 12, wherein:
transmitting the flow control frame to the first source device is also in response to determining that the media access control unit did not transmit a previous flow control frame to the first source device, the previous flow control frame indicating that transmissions of the specified class are to be continued; and
the method further comprises, in response to determining that the media access control unit transmitted the previous flow control frame to the first source device:
the media access control unit refraining from transmitting the flow control frame in response to receiving the subsequent internal continue message.

14. The method of claim 12, wherein at least one of the plurality of entries of the table contains data indicating a period of a delay during which operation (d) is not to be executed, the method further comprising:
pausing the execution of operation (d) after each of the plurality of read cycles for the period of the delay.

15. A destination device comprising:
hardware configured to:
(a) provide a table,
wherein the table comprises a plurality of entries, the plurality of entries including a plurality of port entries, each port entry containing data regarding a respective source port of a respective source device of one or more source devices,
wherein the table has a start and an end;
(b) read each entry of the table from the start of the table to the end of the table;
(c) for each port entry read, determine whether a buffer storage threshold for data received from the source port has been exceeded, carry out an operation defined by:
  when the buffer storage threshold for data received from the source port is determined to have been exceeded, transmit an internal stop message to a media access control unit on the destination device to indicate that transmissions from the source port are to be stopped, and
  when the buffer storage threshold for data received from the source port is determined not to have been exceeded, transmit an internal continue message to the media access control unit on the destination device to indicate that transmissions from the source port are to be continued;
(d) repeat (b) and (c) for each of a plurality of read cycles;
the media access control unit, being configured to: in response to receiving multiple internal stop messages associated with a first source port among one or more ports of the one or more source devices, transmit, via a network coupling, only one flow control frame to the first source port indicating that transmissions from the first source port are to be stopped.

16. The destination device of claim 15, wherein the hardware media access control unit is configured to, during at least one of the plurality of read cycles:
  receive the internal stop message; and
  in response to receiving the internal stop message, transmit, via a network coupling, a flow control frame to the port indicating that transmissions from the source port are to be stopped.

17. The destination device of claim 16, wherein the media access control unit is further configured to:
  transmit the flow control frame to the source port in response to i) receiving the internal stop message, and ii) determining that the media access control unit did not transmit a previous flow control frame to the source port, the previous flow control frame indicating that transmissions from the source port are to be stopped; and
  refrain from transmitting the flow control frame to the source port in response to i) receiving the internal stop message, and ii) determining that the media access control unit transmitted the previous flow control frame to the source port.

18. The destination device of claim 15, wherein the media access control unit is configured to, during at least one of the plurality of read cycles:
  receive the internal continue message; and
  in response to receiving the internal continue message, transmit, via a network coupling, a flow control frame to the source port indicating that transmissions from the source port are to be continued.

19. The destination device of claim 18, wherein the media access control unit is further configured to:
  transmit the flow control frame to the source port in response to i) receiving the internal continue message, and ii) determining that the media access control unit did not transmit a previous flow control frame to the source port, the previous flow control frame indicating that transmissions from the source port are to be stopped; and
  refrain from transmitting the flow control frame to the source port in response to i) receiving the internal continue message, and ii) determining that the media access control unit did transmit the previous flow control frame to the source port.

20. The destination device of claim 15, wherein at least one of the plurality of entries of the table contains data indicates a period of a delay during which operation (d) is not to be executed, the method further comprising:
  pausing the execution of operation (d) after each of the plurality of read cycles for the period of the delay.

\* \* \* \* \*